United States Patent [19]

Felgendreger et al.

[11] Patent Number: 4,650,553

[45] Date of Patent: Mar. 17, 1987

[54] ELECTROLYTIC RECOVERY OF LEAD FROM SCRAP

[75] Inventors: Alfred F. Felgendreger, Cheltenham Township, Montgomery County; Ashley D. Nevers, Upper Merion Township, Montgomery County; William J. Tuszynski, Spinnerstown, all of Pa.

[73] Assignee: Pennwalt Corporation, Philadelphia, Pa.

[21] Appl. No.: 842,578

[22] Filed: Mar. 21, 1986

[51] Int. Cl.[4] ............................................. C25C 1/14
[52] U.S. Cl. ................................................. 204/114
[58] Field of Search .................. 204/114, 119; 75/120

[56] References Cited

U.S. PATENT DOCUMENTS 4,460,442  7/1984  Ducati ................................. 75/120
4,597,841  7/1986  Hiessling et al. ................... 204/114

Primary Examiner—R. L. Andrews

[57] ABSTRACT

Lead is recovered from lead-containing scrap metal in an electrolytic process employing an aqueous solution of $C_{1-4}$ alkanesulfonic acid as the electrolyte at a high concentration, scrap lead as the anode, and an electroconductive cathode, impressing an electromotive force across the solution between the electrodes to provide a specified steady-state concentration of lead salt in the electrolyte, and continuing the process to deplete the anode and collect lead at the cathode.

7 Claims, 2 Drawing Figures

ELECTROLYTIC RECOVERY OF LEAD FROM SCRAP

BACKGROUND OF THE INVENTION

This invention concerns the recovery of lead from lead-containing scrap, preferably lead from spent lead-acid storage batteries. More particularly, it concerns the recovery of lead in an electrolytic process employing an aqueous $C_{1-4}$ alkanesulfonic acid solution as the electrolyte at a concentration of from about 15 to 70 weight percent and a steady-state concentration of lead salt of no greater than 7.5% based on the weight of the electrolyte.

PRIOR ART

The use of an organic sulfonic acid as an electrolyte in an electrodepository process for the plating of lead is known[1]. However, the prior art processes employ comparatively high concentrations of lead salts (in excess of 10% by weight) in the electrolyte solution, which is usually prepared by first dissolving lead alkanesulfonate in the aqueous electrolyte up to the concentration of the salt in the bath. The high concentration of lead salt in the electrolyte is stated in the literature to be essential because, while it is necessary to use a reasonable current density in the plating process, the quality of the plate suffers badly if the metal deposition occurs under conditions where the electrode reaction is even partially mass-transfer-controlled[2], as can occur at low lead concentration. In addition, the high concentrations of lead salts in the plating process favor high current efficiency because the high ratio of lead ion to hydrogen ion in solution tends to repress hydrogen release at the cathode.

1. U.S. Pat. No. 2,525,942 Nobel et al. "High Speed Tin and Tin-Alloy Plating Symposium, April 1985, American Electroplaters' Society, Inc., Orlando, Fla.
2. Pletcher, Derek "Industrial Electrochemistry", 1984, Chapman and Hall, London, pp. 181,183.

Processes for the recovery of lead from spent lead-acid storage batteries are known[3]. These prior disclosures teach the use of electrolyte solutions including, for example, sulfamic acid, acetic acid, fluoboric acid, fluosilicic acid, perchlorates, cyanides, nitrates, oxalates, and pyrophosphates. Each of these acidic materials demonstrate certain problems which makes replacement thereof in electrolyte solutions at least desirable. For example, sulfamic acid hydrolyzes under acidic conditions to ammonium bisulfate. The sulfate precipitates lead as lead sulfate, thereby lowering the lead recovery, making electrolyte filtration necessary, and generating a toxic waste (lead sulfate). Fluoboric acid cannot be discharged into many municipal waste-treatment systems due to restrictions of fluoride and boron discharges. The lead salt of acetic acid is highly soluble but acetic acid is a weak acid with poor conductivity at high concentrations leading to excessive power consumption. Fluosilicic acid is a toxic material which cannot be discharged to the environment. Other mentioned acidic material previously suggested as electrolytes for lead recovery have similar drawbacks and, in addition, may be explosive, flammable and/or prone to encourage sludge formation and to form difficult-to-separate lead complexes. Complexing tendencies of some of these acidic materials makes it difficult to sufficiently reduce the lead content of the electrolyte solution in which they are used to avoid it being classified as hazardous waste.

3. U.S. Pat. No.'s 3,985,630; 4,098,658; 4,460,442

STATEMENT OF THE INVENTION

This invention is a process for the electrolytic recovery of scrap lead which comprises utilizing an aqueous solution of $C_{1-4}$ alkanesulfonic acid as the electrolyte at a concentration of about 15 up to about 70% based on the weight of the electrolyte, scrap lead as the anode and an electroconductive material as the cathode, impressing an electromotive force across said electrolyte between the electrodes immersed in said electrolyte to provide a steady-state concentration of lead salt in the electrolyte ranging from about 0.2 to about 7.5% based on the weight of electrolyte solution, and continuing the electrolytic process to deplete the anode and recover lead at the cathode.

THE DRAWING

FIGS. 1 and 2 of the drawing are graphs of plotted points representing measurements of the current density (amps per square meter) and current efficiency (%) at various applied voltages in electrolytic lead recovery systems as later described in Examples 2 and 3. Data points in the graphs represent the averages of several runs under each set of experimental conditions of the examples and straight lines were fitted using the standard linear leastsquares procedure. The standard deviations, calculated from the pooled variances for 25 observations for both MSA and fluoboric acid were ±39 $A/m^2$ and ±30% for current density and current efficiency, respectively. FIG. 1 compares the current density and current efficiency for a 25 wt% aqueous methanesulfonic acid electrolyte system with a 30 wt% aqueous fluoboric acid electrolyte system. FIG. 2 compares the current density and current efficiency for a 25 wt% aqueous methanesulfonic acid electrolyte system with a 50 wt% aqueous fluoboric acid electrolyte system.

DETAILED DESCRIPTION OF INVENTION

Figure 1:
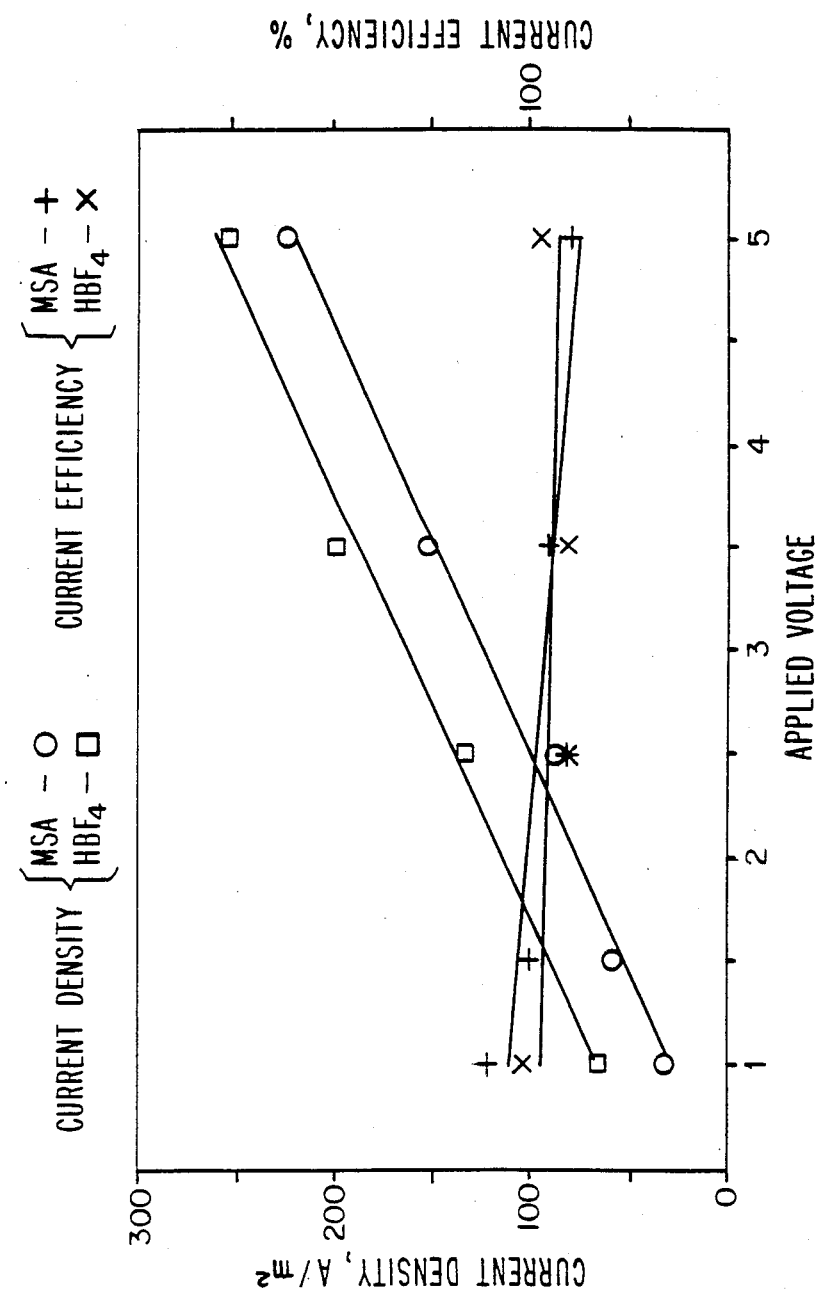

This is a hydrometallurgical process for recovering lead from lead-containing scrap, preferably from spent lead-acid storage batteries. The process employs an aqueous solution of one or a mixture of alkanesulfonic acids having carbon chain lengths of 1 to 4 as the electrolyte. Such sulfonic acids include, for example, methanesulfonic acid, ethanesulfonic acid, propanesulfonic acid, isopropanesulfonic acid, butanesulfonic acid and isobutanesulfonic acid. The preferred sulfonic acid is methanesulfonic acid (MSA) because of its availability, low molecular weight, high innate solubility in water and high water solubility of its lead salt. The sulfonic acid is employed at a concentration of about 15% up to about 70% based on the weight of the electrolyte solution (155 to 930 grams/liter). Preferably, the sulfonic acid is used in the electrolyte solution at a concentration of from about 20 to about 40% (215 to 470 g/l), more preferably at about 25% (275 g/l).

The electromotive force impressed on the electrolytic system is a direct current (DC) voltage ranging from about 1 to about 6 volts resulting in a steady-state concentration of lead salt in the electrolyte bath of from about 0.2 to about 7.5% based on the weight of the electrolyte-salt solution (2 to 100 g/l). The optimum voltage for maximum current efficiency in this process ranges from about 1 to about 3 with the use of aqueous methanesulfonic acid as the electrolyte.

In general, for any given electrolyte acid concentration in an electrochemical system, power consumption is minimized (optimized) when conductivity is maximized, and this occurs when the concentration of dissolved lead is at a maximum. However, in this and similar lead recovery processes, the dissolved lead concentration in the electrolyte is not an independent variable; it will depend on electrolyte concentration, choice of electrolyte and operating voltage.

"Steady-state" as used herein means the concentration of lead salts in the electrolyte when the rate of dissolution of the lead from the anode equals the rate of deposition of the lead metal on the cathode in a system operating at a specified impressed voltage and electrolyte concentration. The steady-state concentration (and hence the power efficiency) may be increased up to the point where poor quality lead deposits or the upper operating limits of the equipment are reached.

The anode for the process of this invention is scrap lead of any desired shape which may contain up to 20% of other metals including, for example, antimony, copper, tin, titanium, calcium and arsenic. In a more preferable embodiment, the scrap lead anode is the electrode or electrodes of lead-acid storage batteries and, in the most preferable embodiment, at least one assembled or partially assembled lead-acid storage battery comprising a series of electronically connected positive and negative couples of lead-containing electrodes as disclosed in U.S. Pat. Nos. 3,985,630 and 4,098,658. The disclosure of these two references, in so far as they pertain to the use of the assembled lead-acid storage battery or batteries as an electrode in a lead recovery process, are incorporated here-in by reference, in particular, that portion of U.S. Pat. No. 3,985,630 beginning at line 15 of column 4 and continuing through column 6 up to line 48, and that portion of U.S. Pat. No. 4,098,658 beginning at line 37, column 5 and continuing through column 7.

The cathode of this invention may be any electroconductive material in any desired shape which is substantially insoluble in the electrolyte under the conditions of the process. Typical cathode materials are lead and graphite preferably fabricated in a flat shape.

The temperature at which this process is operated is not critical. Preferably, it is carried out at ambient temperature although, due to a moderate exotherm during operation, the temperature may rise. Temperatures generally do not exceed 40°–50° C. and external cooling is typically not required.

The electrolytic cell of this invention includes a tank or vessel of a suitable size and shape in which the electrolytic process may be operated in the desired fashion. The material from which the tank is fabricated may be nonelectrically conductive or electrically conductive, if properly insulated, as is well known in this art.

The concentration of lead ions (dissolved lead salt) in the electrolyte solution is determined by the chemical composition of the electrolyte (acid type and its concentration in the solution) and the applied voltage on the electrolytic system. Thus, for example, the employment of methanesulfonic acid at a concentration of 25% and an applied DC voltage of 3.5 will produce a steady-state concentration of lead in the electrolyte bath of about 1.26% (See Table 1). At a given voltage, the bath conductance and, consequently, the power costs, are, in part, determined by the concentration of lead ions in the bath. Experiments have shown that, at any specified voltage, a higher steady-state concentration of lead ions is reached with a 25 wt% aqueous MSA electrolyte solution than with a 50 wt% aqueous fluoboric acid (HBF$_4$) electrolyte solution (a preferred electrolyte of the prior art for scrap lead recovery) when scrap lead anodes were subjected, under otherwise similar conditions, to currents over the range of from 1 to 5 volts. At these higher steady-state lead ion concentrations obtained with an MSA electrolyte solution, current densities in the MSA system unexpectedly approach or are equal to those of the HBF$_4$ system at voltages of between 1 and 5 despite the known higher conductivity of aqueous HBF$_4$ versus aqueous MSA (See FIG. 2). Since the cost of MSA (on a 100% weight basis) is lower than that of HBF$_4$, the alkanesulfonic acid-based process of this invention achieves substantial raw material cost savings, both by virtue of the lower cost per pound and by the use of a lower preferred concentration, over the presently preferred electrolyte acid for scrap lead recovery.

An important further advantage of the lower-alkane-sulfonic acid electrolyte solutions over the electrolyte solutions previously disclosed in the art for lead recovery is the ease with which the spent sulfonic acid electrolyte can be disposed. The lead ion concentration of the alkane-sulfonic acid electrolyte can be reduced to well below 1 part per million (ppm) simply by adjusting the pH to 8–9. The lower alkane-sulfonic acid, after neutralization, can be easily disposed of without causing significant environmental pollution.

The current densities reported in the following examples were determined by measuring the current with an ammeter and the result, averaged over the course of a run, was divided by the surface area of the cathode. The current efficiencies were computed from the averaged current in amperes (C), time [duration in seconds (T) of the deposition process] and quantity in grams (W) of lead recovered at the cathode using the folowing equation:

$$\text{Current Efficiency (\%)} = \frac{W \times 96{,}500 \times 100}{C \times T \times 103.6}$$

EXAMPLE 1

To establish a comparison between the steady-state concentration of lead salt for MSA (methanesulfonic acid) and HBF$_4$ (fluoboric acid) electrolytes in the recovery of lead from lead scrap, an electrolytic recovery operation employing scrap lead as the anode, lead foil as the cathode, a voltage of 3.5 and an aqueous electrolyte containing 25% MSA, based on the weight of the electrolyte solution, was carried out. The current density was 185 amps/square meter and the current efficiency was 87%. Another electrolytic lead recovery operation was carried out utilizing the same system and conditions except that the electrolyte was an aqueous solution containing 50% of HBF$_4$ based on the weight of the solution. In this system, the current density was 165 amps/square meter and the current efficiency 70%. The current densities and current efficiencies reported above were obtained from single-run data. The following table shows the lead ion concentration (wt.%) formed in the electrolyte over a time period of 3600 seconds.

TABLE 1

| TIME (SEC.) | 25% MSA | 50% HBF$_4$ |
|---|---|---|
| 60 | .049 | .069 |
| 120 | .105 | .109 |
| 600 | .518 | .382 |

TABLE 1-continued

| TIME (SEC.) | 25% MSA | 50% HBF$_4$ |
| --- | --- | --- |
| 900 | .738 | .476 |
| 1200 | .933 | .522 |
| 1800 | 1.24 | .604 |
| 2400 | 1.27 | .798 |
| 3000 | 1.26 | .723 |
| 3600 | 1.23 | .744 |

In the above table, the concentrations enveloped by the dashed line represent the steady-state concentrations formed in each system when subject to the same operating conditions except for the electrolyte and its concentration. Unexpectedly, the 25% MSA system developed a current density at its higher steady-state concentration which density is essentially equivalent to that of the 50% HBF$_4$ electrolyte system at its lower steady-state concentration.

EXAMPLE 2

A lead anode taken from a discharged and recharged motorcycle battery consisting of a soft lead paste supported on a hard lead grid was electrolyzed in a bath containing a 25% by weight aqueous solution of MSA using lead foil for the cathode. The electrode areas were initially each about 25 square centimeters and the distance between the immersed electrodes was 12 centimeters. The bath was agitated using a magnetic stirrer. In the same procedure as recited above, hydrometallurgical lead recovery was carried out except that a 30% by weight aqueous solution of HBF$_4$ was used in place of the 25% MSA electrolyte solution. For each procedure, the cathode current density and cathode current efficiency were measured as a function of the applied voltage and the measured data plotted in FIG. 1 of the drawing. These data show that the two electrolyte solutions behave in an unexpectedly similar fashion, especially as regards current efficiency, despite the large differences in conductivity observed for both the free acids and their respective lead salts.

EXAMPLE 3

Figure 2:
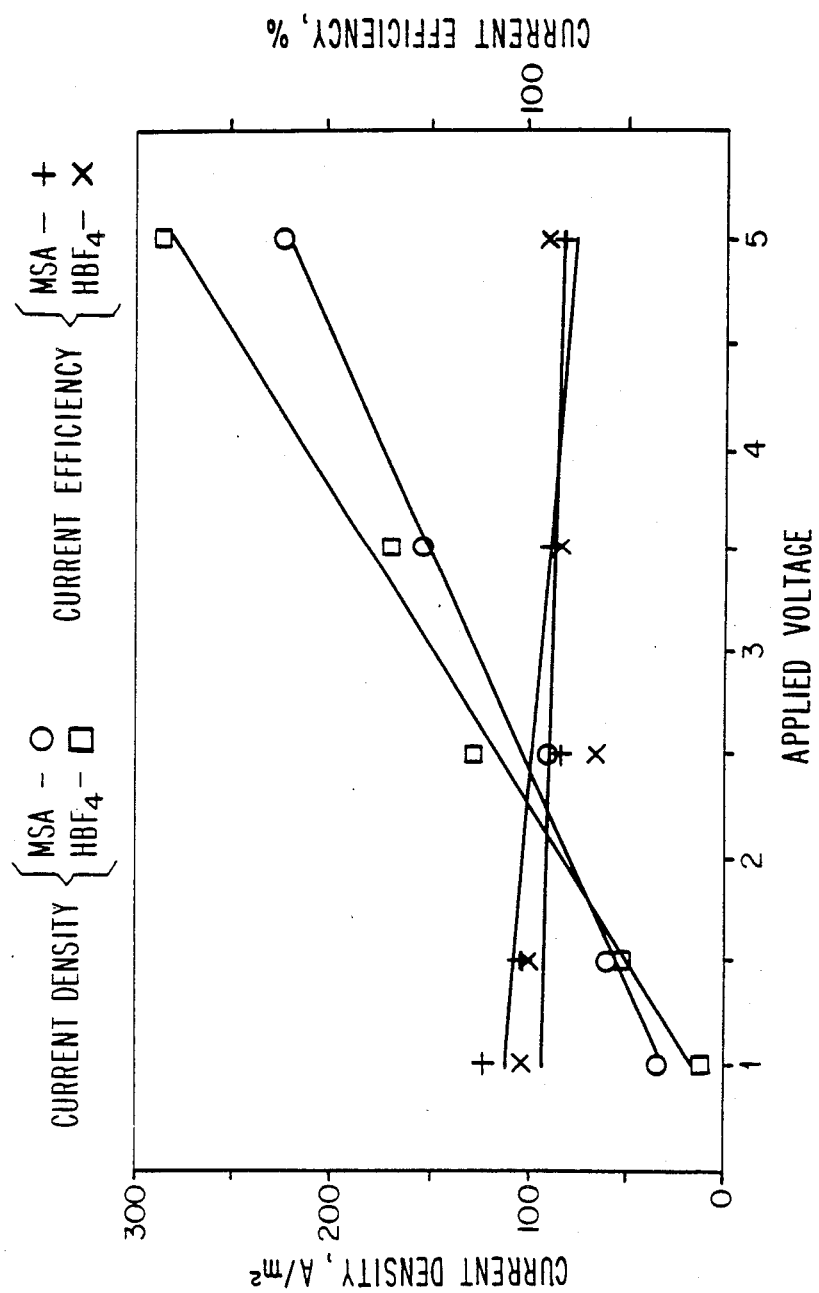

The current density and efficiency performances of a 25% by weight aqueous MSA solution and 50% by weight HBF$_4$ solution as electrolytes in the hydrometallurgical recovery of lead under the conditions described in Example 2 were compared and the measured data plotted in the graph of FIG. 2 of the drawing. Again, the data show unexpectedly similar density and efficiency performances for the two electrolytes despite the significantly greater conductivity for both HBF$_4$ and its lead salt.

We claim:

1. A process for the electrolytic recovery of scrap lead which comprises utilizing an aqueous $C_{1-4}$ alkanesulfonic acid as the electrolyte at a concentration of about 15 to about 70% based on the weight of the electrolyte, scrap lead as the anode and an electroconductive material as the cathode, impressing an electromotive force across said electrolyte between the electrodes immersed in said electrolyte to thereby provide a steady state concentration of lead salt in the electrolyte ranging from about 0.2 to about 7.5% based on the weight of the electrolyte-salt solution, and continuing the electrolytic process to deplete the anode and recover lead at the cathode.

2. The process of claim 1 wherein the $C_{1-4}$ alkanesulfonic acid is methanesulfonic acid.

3. The process of claim 2 wherein the concentration of methanesulfonic acid is from about 20 to about 40%.

4. The process of claim 2 wherein said electromotive force is a voltage ranging from about 1 to about 3.

5. The process of claim 4 wherein the concentration of methanesulfonic acid is from about 20 to about 40%, and the anode is at least one electrode of a lead-acid storage battery.

6. The process of claim 5 wherein said anode is at least one lead-acid storage battery composed of a series of electronically-connected positive and negative couples of lead-containing electrodes.

7. The process of claim 6 wherein there are at least two of said storage batteries connected in series to one another.

* * * * *